Dec. 11, 1928.                                              1,694,629
C. SCHAER
PROCESS AND APPARATUS FOR WELDING PLATES
Filed Feb. 16, 1928          2 Sheets-Sheet 1
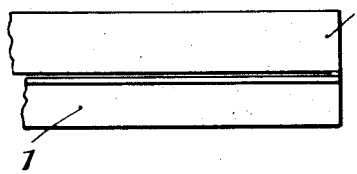
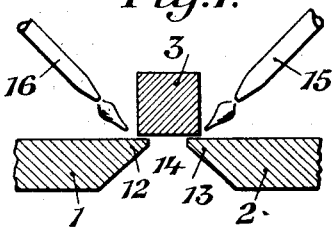
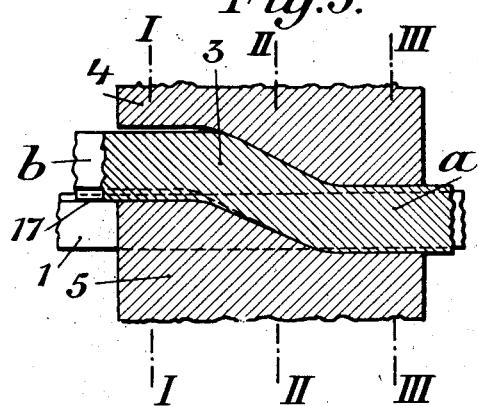
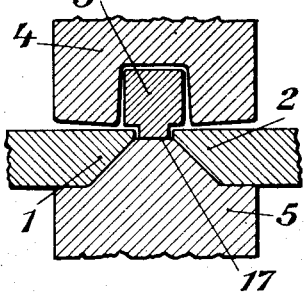
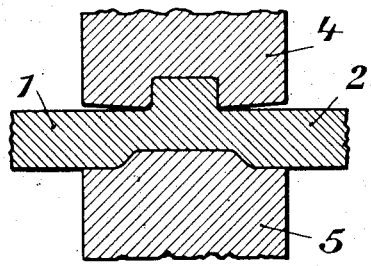
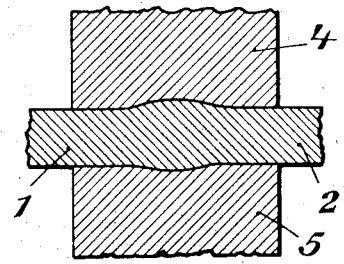
INVENTOR:
Charles Schaer
BY
ATTORNEYS Dec. 11, 1928.
1,694,629
C. SCHAER
PROCESS AND APPARATUS FOR WELDING PLATES
Filed Feb. 16, 1928    2 Sheets-Sheet 2
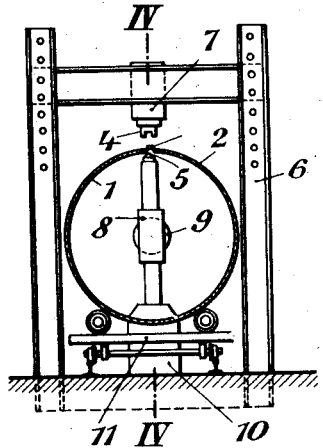
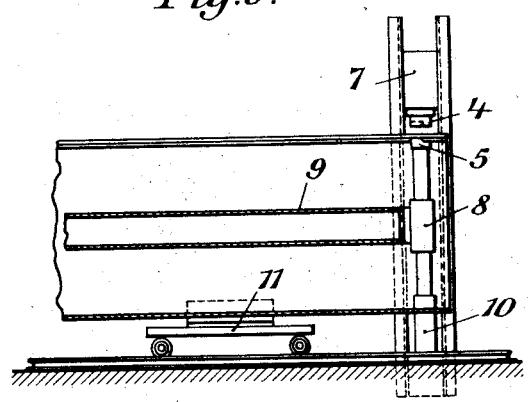
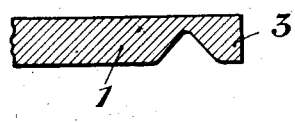
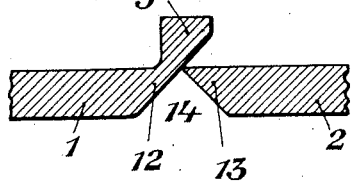
INVENTOR:
Charles Schaer
BY
ATTORNEYS Patented Dec. 11, 1928.

1,694,629

UNITED STATES PATENT OFFICE.

CHARLES SCHAER, OF LANGENTHAL, SWITZERLAND, ASSIGNOR TO THE FIRM SULZER FRERES, SOCIETE ANONYME, OF WINTERTHUR, SWITZERLAND.

PROCESS AND APPARATUS FOR WELDING PLATES.

Application filed February 16, 1928, Serial No. 254,727, and in Switzerland February 28, 1927.

This invention relates to a process and apparatus for welding plates, and has for its object to provide an improved process in which the operation is simplified and the heat consumption reduced to a minimum.

According to the present invention the meeting edges of the plate are bevelled and a rod-like bridge member is laid along the joint above the sharp or nearest edges of the plates which are then heated with the rod and subsequently welded together, during which process the edges of the plates are bent or turned over. The apparatus for carrying the process into effect may comprise means whereby the bridge member is forced into the gap between the plates thus simultaneously bending over the bevelled edges of the plates, this part of the process being preferably carried out by means of a pair of jaws so formed as gradually to change the bridge member from its initial shape to that which it finally possesses.

The bridge member is preferably guided laterally by means of the upper jaw member and while it is being forced into the gap the supply of heat may be reduced to a minimum or moved so as to act upon the adjacent unwelded portion of the joint to preheat it. If desired the bridge member may take the form of a rod of the same length as the joint to be welded.

The invention may be carried out in various ways but one process and apparatus for welding plates according thereto is diagrammatically illustrated in the accompanying drawings in which Figure 1 illustrates in cross section two plates to be welded, Figure 2 is an elevation projected from Figure 1, Figure 3 shows a section through the jaws for forcing the bridge member into the joint, Figure 4 is a section on the line I—I of Figure 3, Figure 5 is a section on the line II—II of Figure 3, Figure 6 is a section on the line III—III of Figure 3, Figure 7 illustrates an apparatus for welding boiler plates, Figure 8 is a section on the line IV—IV of Figure 7, and Figures 9 and 10 illustrate modifications of the plates shown in Figure 1.

In the construction illustrated in Figures 1–6 the meeting edges of the plates 1 and 2 are bevelled at 12 and 13 and a rod-like bridge member 3 is laid along the joint on the side of the plates remote from the bevel (i. e. the upper side in Figure 1). The bridge member 3 is in the form of a bar equal in length to the joint to be welded. The bar 3 together with the bevelled ends 12 and 13 of the plates 1 and 2 are heated to the welding temperature by means of burners 15 and 16, whereupon the bar 3 is forced into the gap 14 between the ends of the plates by means of jaws 4 and 5. As the bar is forced into the gap the bevelled ends 12 and 13 are simultaneously bent or turned over, while the portion of the bar 3 immediately following the part being welded is prevented from moving laterally owing to the shape of the upper jaw 4 which holds it in position.

The complete apparatus is illustrated in Figures 7 and 8 and comprises a frame 6 carrying a cylinder 7 which serves to actuate the movable jaw 4, the lower jaw 5 being formed on a rod mounted at its lower end on a block 10 and also passing through a sleeve 8 carried at the end of a horizontal support 9. The cylinder 7 may be supplied with any desired pressure-creating medium, such for example as water, compressed air or steam.

Owing to the shape of the jaws 4 and 5 the bar 3 is forced in between the plates 1 and 2 step by step and in this manner a gradual change is effected from the initial shape of the bar to that which it possesses after the welding operation.

While the bar 3 is being forced into the gap between the plates 1 and 2 the burners 15 and 16 are moved (by means not shown in the drawing) so as to act upon the adjacent unwelded portion of the joint to preheat it. Means are also provided for regulating the burners so that if desired the supply of heat may be reduced to a minimum during the pressing operation.

When theh edges of the plates and the bar 3 have all been well pressed together the work (plates and bar) are fed into a new position relative to the jaws 4 and 5, in which, as shown in Figure 3, the portion $a$ of the bar 3 is in the final position after welding while the portion $b$ is in the initial position above the joint. The bridge member or bar 3 may rest directly on the plates 1 and 2 or may rest on a distance piece 3ᵃ (Figure 2) and if desired may be provided with a rib 17 serving to guide it between the plates as shown in Figure 4.

The relative movement between the work and the jaws may be effected either by maintaining the jaws stationary and feeding the work along or by maintaining the work stationary and moving the jaws. The bridge member may be in the form of a rod having a triangular, square, polygonal, round or any other desired cross section. When used to make circumferential welds the rod is conveniently first bent to the correct radius before being put into place.

It will be appreciated that the process and apparatus according to the invention renders it possible to use a single bridge member of the appropriate length to effect the complete welding operation. Further, that the invention is more particularly intended for use in welding plates having an appreciable thickness, i. e. plates other than those formed of sheet metal of insufficient thickness to form a butt joint. The bridge member need not be separately laid because, as shown in Figs. 9 and 10, the same arrangement as with a separated bridge member results, if a part of the plates to be welded together is correspondingly formed and bent.

While according to Fig. 1 the rolling direction of the bridge member may correspond to that of the parts to be welded, the rolling direction of the bridge member pressed into the joint is according to the modification shown in Figs. 9 and 10 different from that of the plates 1 and 2.

I claim:

1. Process for welding plates, which consists in bevelling the meeting edges of the plates, laying a rod like bridge member along the joint above the sharp or nearest edges of the plates, heating the edges and the rod and then welding them together by bending or turning over the edges of the plates.

2. Process for welding plates, which consists in bevelling the meeting edges of the plates, laying a rod like bridge member along the joint above the sharp or nearest edges of the plates, heating the edges and the rod and then welding them together by bending or turning over the edges of the plates, and forcing the bridge member into the gap between the plates.

3. Process for welding plates, which consists in bevelling the meeting edges of the plates, laying a rod like bridge member along the joint above the sharp or nearest edges of the plates, heating the edges and the rod and then welding them together by bending or turning over the edges of the plates and forcing the bridge member into the gap between the plates by means of two jaws so formed as gradually to change the bridge member from its initial shape to that finally desired.

4. Process for welding plates, which consists in bevelling the meeting edges of the plates, laying a rod, like bridge member along the joint above the sharp or nearest edges of the plates, heating the edges and the rod and then welding them together by bending or turning over the edges of the plates under a heat gradually reduced to a minimum.

5. Process for welding plates, which consists in bevelling the meeting edges of the plates, laying a rod like bridge member along the joint above the sharp or nearest edges of the plates, heating the edges and the rod and then welding them together by bending or turning over the edges of the plates and forcing the bridge member into the gap between the plates and simultaneously removing the parts to be welded from the heating source.

6. Process for welding plates, which consists in bevelling the meeting edges of the plates, laying a rod like bridge member along the joint above the sharp or nearest edges of the plates, heating the edges and the rod and then welding them together by bending or turning over the edges of the plates and forcing the bridge member into the gap between the plates by means of two jaws so formed as gradually to change the bridge member from its initial shape to that finally desired and to guide it laterally.

7. Process for welding plates, which consists in bevelling the meeting edges of the plates, laying a rod like bridge member of the same length as the joint to be welded along the joint above the sharp or nearest edges of the plates, heating the edges and the rod and then welding them together by bending or turning over the edges of the plates.

In testimony whereof I have affixed my signature.

CHARLES SCHAER.